US008844107B2

(12) United States Patent  (10) Patent No.: US 8,844,107 B2
Casavant et al.  (45) Date of Patent: Sep. 30, 2014

(54) SYSTEM FOR ASSEMBLING AND DISASSEMBLING A TURBINE SECTION OF A GAS TURBINE

(71) Applicant: General Electric Company, Schenectady, NY (US)

(72) Inventors: Matthew Stephen Casavant, Greenville, SC (US); Kenneth Damon Black, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 13/673,132

(22) Filed: Nov. 9, 2012

(65) Prior Publication Data
US 2014/0130342 A1  May 15, 2014

(51) Int. Cl.
| B23P 6/00 | (2006.01) |
| B23P 19/04 | (2006.01) |
| F16M 13/00 | (2006.01) |
| B23P 11/00 | (2006.01) |
| F01D 25/28 | (2006.01) |
| F01D 21/04 | (2006.01) |

(52) U.S. Cl.
CPC .............. *B23P 11/00* (2013.01); *F05D 2230/64* (2013.01); *F05D 2230/68* (2013.01); *F16M 13/00* (2013.01); *F01D 25/28* (2013.01); *F01D 25/285* (2013.01); *F01D 21/045* (2013.01)
USPC ............ 29/240; 29/402.03; 29/700; 29/889.1

(58) Field of Classification Search
USPC .............. 29/700, 889.1, 402.04, 888.01, 240, 29/402.03; 415/213.1, 116, 117, 176, 178, 415/214.1
See application file for complete search history.

(56) References Cited

U.S. PATENT DOCUMENTS

| 6,189,211 | B1 | 2/2001 | Suter |
| 6,257,829 | B1 | 7/2001 | Seeley et al. |
| 6,352,404 | B1 | 3/2002 | Czachor et al. |
| 8,142,150 | B2 | 3/2012 | Frick et al. |
| 2012/0145976 | A1 | 6/2012 | Hynous et al. |
| 2012/0272496 | A1 | 11/2012 | Herbold et al. |
| 2013/0326875 | A1* | 12/2013 | Black et al. ................. 29/888.01 |
| 2014/0026414 | A1* | 1/2014 | Holmes et al. ............ 29/888.021 |

FOREIGN PATENT DOCUMENTS

DE  19821889 A1  11/1999

OTHER PUBLICATIONS

EP Search Report issued Mar. 31, 2014 in connection with corresponding EP Patent Application No. 13191981.3.

\* cited by examiner

*Primary Examiner* — Alexander P Taousakis
(74) *Attorney, Agent, or Firm* — Dority & Manning, PA

(57) ABSTRACT

A counter weight for installing and removing a lower portion of an inner casing of a turbine section generally includes a semi-annular main body having a first radially extending mating surface and a second radially extending mating surface. A radial gear rack extends radially outward from the main body. The radial gear rack includes a primary segment that extends a first angular distance between the first radially extending mating surface and the second radially extending mating surface of the main body. A secondary segment of the radial gear rack extends a second angular distance from the second radially extending mating surface of the main body. The secondary segment defines an at least partially linear inner surface and an outer arcuate surface.

20 Claims, 10 Drawing Sheets

US 8,844,107 B2

SYSTEM FOR ASSEMBLING AND DISASSEMBLING A TURBINE SECTION OF A GAS TURBINE

FIELD OF THE INVENTION

The present invention generally relates to equipment suitable for use when assembling and disassembling turbo machines. More particularly, this invention relates to a system capable of installing and uninstalling inner turbine casings of a turbine engine.

BACKGROUND OF THE INVENTION

In the operating environment of a turbine section of a turbomachine such as a gas turbine, the structural integrity of various turbine components such as turbine rotor wheels, rotor blades, rotor shaft and other components within the turbine section is of great importance to turbomachine operators. As the turbomachine cycles between various operating conditions such as start-up, shut-down, base-load or part-load operation, the various turbine components are subjected to high thermal and mechanical stresses. As a result, it is necessary to inspect, repair and/or replace the various turbine components during regularly scheduled maintenance intervals or during unplanned outages to prevent component failures. However, access to the various turbine components may be challenging, particularly for a turbomachine that is installed at an owner/operator's facility.

The construction of turbine sections that utilize multiple casings has become a common approach for facilitating the on-site maintenance of land-based gas turbine engines. As known in the art, turbines having this type of construction include an inner casing surrounded by an outer casing, and frames that are split on the machine horizontal centerline, such that upper halves of the inner and outer casings, and frames may be lifted individually for access to internal parts of the turbine. For example, by lifting the upper halves of the turbine inner and outer casings, the turbine rotor wheels, buckets and nozzle assemblies can be inspected and possibly repaired or replaced without necessitating removal of the entire turbine rotor. Prior to casing removal, proper machine centerline support using mechanical jacks is necessary to assure proper alignment of the rotor and to obtain accurate casing clearances. In particular instances, the mechanical jacks provide support to the lower half casing.

The removal and reinstallation of the lower half of the turbine inner casing for the purpose of conducting a complete inspection of the turbine section present significant challenges to maintenance personnel. For example, work space may be significantly limited in the location of the lower half of the turbine casing. In addition, very tight tolerances exist between the turbine rotor blades and the lower half of the inner casing, thereby increasing the risk of damage to the various turbine components positioned within the lower half of the casing. Therefore, an improved system for installing and uninstalling the lower portion of the inner turbine casing of a gas turbine engine would be useful.

BRIEF DESCRIPTION OF THE INVENTION

Aspects and advantages of the invention are set forth below in the following description, or may be obvious from the description, or may be learned through practice of the invention.

One embodiment of the present invention is a counter weight for installing and removing a lower portion of an inner casing of a turbine section. The counter weight includes a semi-annular main body having a first radially extending mating surface and a second radially extending mating surface on a circumferentially opposite side of the main body. A radial gear rack extends radially outward from the main body. The radial gear rack includes a primary segment that extends a first angular distance between the first radially extending mating surface and the second radially extending mating surface of the main body. A secondary segment extends a second angular distance from the second radially extending mating surface of the main body. The secondary segment defines an at least partially linear inner surface and an outer arcuate surface.

Another embodiment of the present invention is a system for installing and removing a lower portion of an inner casing of a turbine section of a gas turbine. The system includes a semi-annular counter weight having a shape that coincides with the lower portion of the inner casing. The counter weight includes a main body having a first radially extending mating surface and a second radially extending mating surface on a circumferentially opposite side of the main body. A radial gear rack extends radially outward from the main body. The radial gear rack includes a primary segment that extends a first angular distance between the first radially extending mating surface and the second radially extending mating surface. The radial gear rack further includes a secondary segment extending a second angular distance from the second radially extending mating surface. The secondary segment includes an at least partially linear inner surface and an outer arcuate surface. The system further includes a drive system that is engaged with the radial gear rack.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
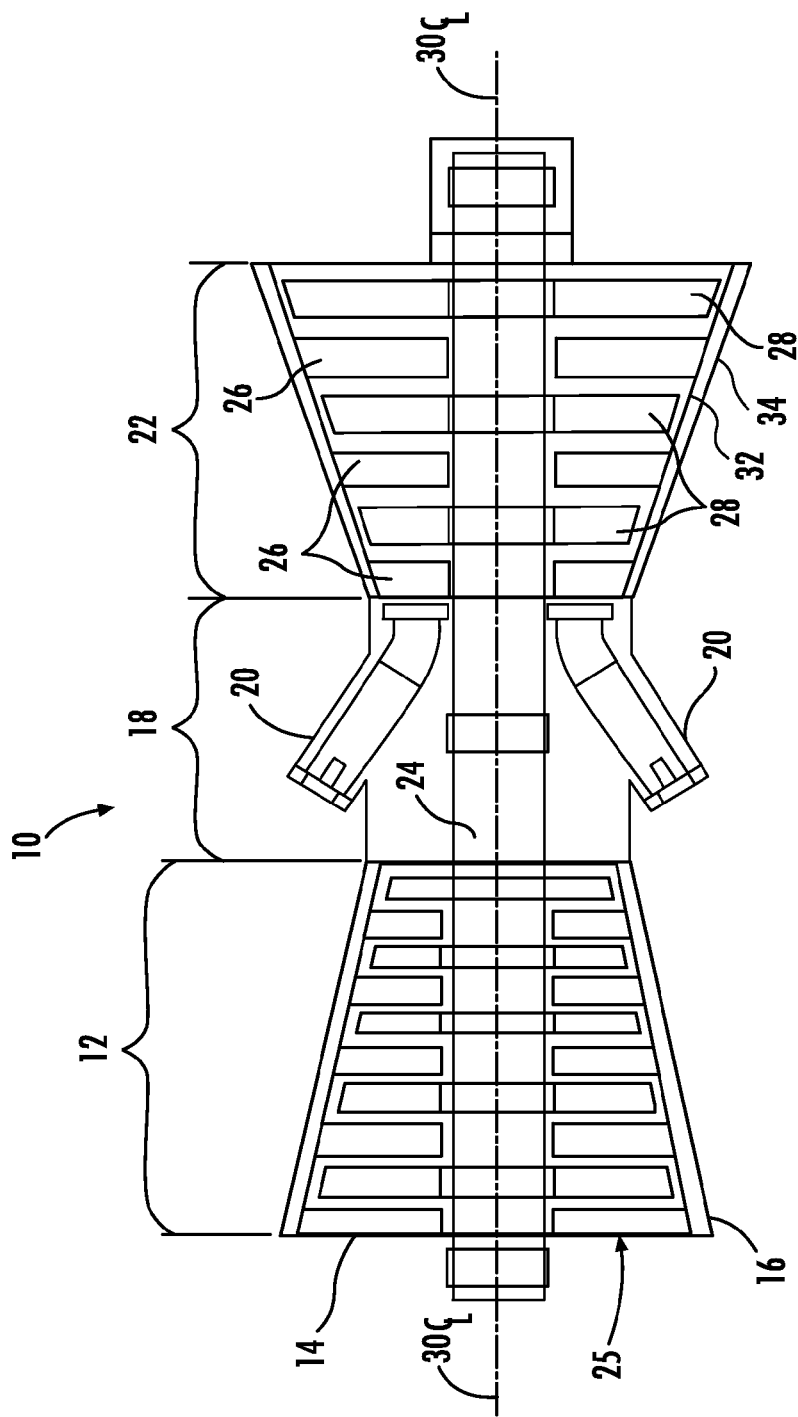
FIG. 1 illustrates a cross section side view of a known gas turbine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

While it is possible to gain access to a rotor and other internal components of a turbine section of a gas turbine by completely disassembling the turbine section, inspections, maintenance and repairs are preferably completed with the rotor and internal components remaining in-situ because of the importance of outage duration which is directly related to the cost of the outage. The system described herein involves a system having a counter weight for removing a lower portion of an turbine section inner casing in order to provide access to the rotor and internal components of the turbine section without the need for a more complicated and costly disassembly of the turbine section.

Referring now to the drawings, FIG. 1 illustrates a cross section of side view of a known gas turbine 10. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having a combustor 20 downstream from the compressor section 12, and a turbine section 22 downstream from the combustion section 18. A shaft 24 extends generally axially through the gas turbine 10. The turbine section 22 generally includes alternating stages of stationary nozzles 26 and turbine rotor blades 28 positioned within the turbine section 22 along an axial centerline 30 of the shaft 24. An inner casing 32 circumferentially surrounds the alternating stages of stationary nozzles 26 and the turbine rotor blades 28. An outer casing 34 circumferentially surrounds the inner casing 32.

Figure 2:
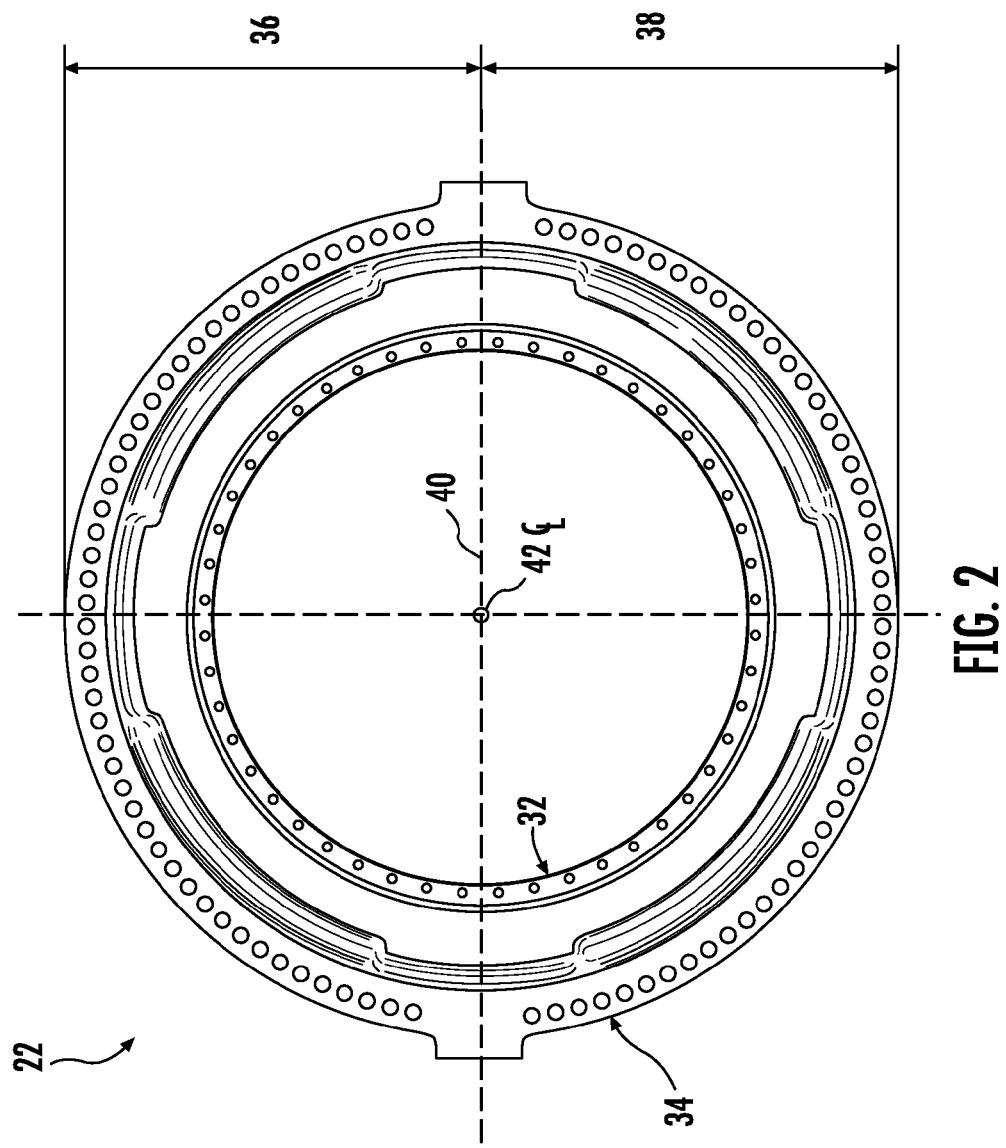
FIG. 2 illustrates a downstream view of a portion of a turbine section of a gas turbine according to at least one embodiment of the present disclosure.
Figure 3:
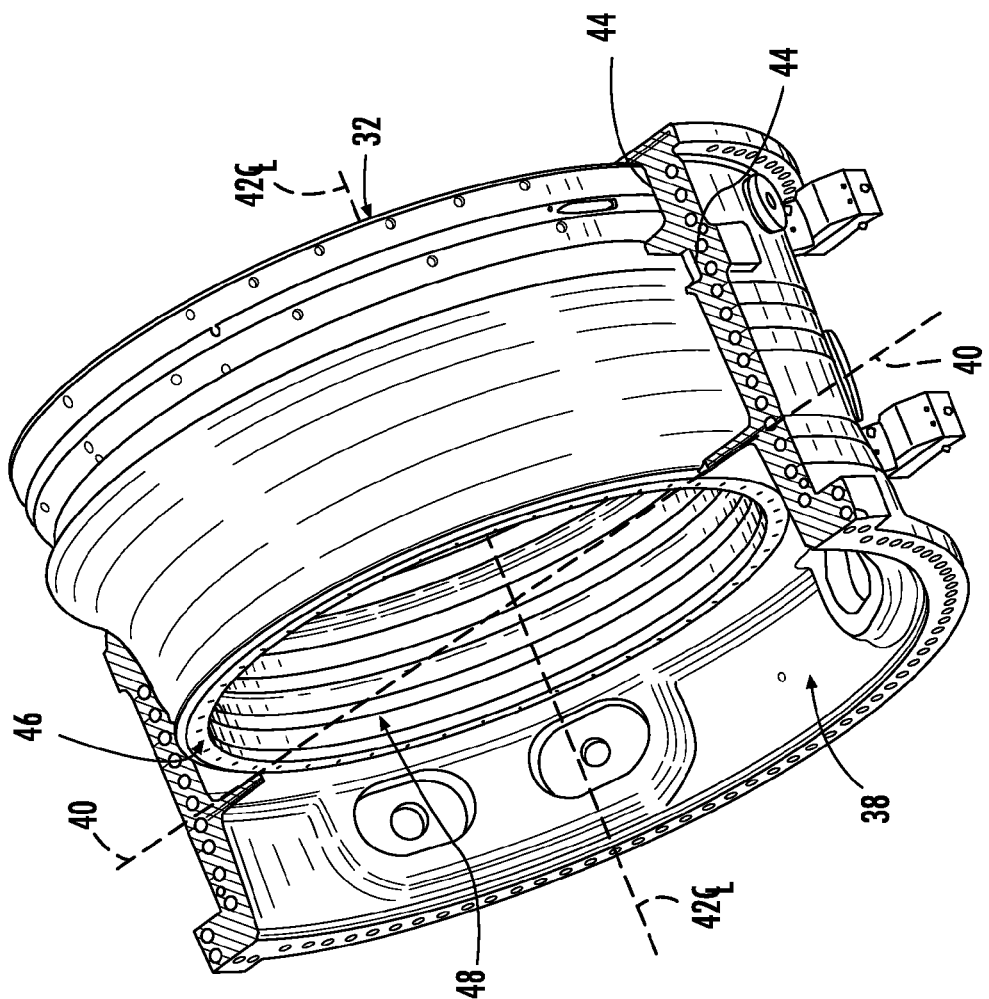
FIG. 3 illustrates a perspective view of a portion of the turbine section as shown in FIG. 2.

FIG. 2 illustrates a downstream view of the inner and outer casings 32, 34 of the turbine section 22, and FIG. 3 provides a perspective view of the inner and the outer casings 32, 34 with a portion of the outer casing 34 removed. As shown in FIG. 2, the inner and outer casings 32, 34 are split along a horizontal plane 40 that extends perpendicular to a common axial centerline 42 that extends through the inner and the outer casings 32, 34. The outer casing 34 is split into a top portion 36 and a bottom portion 38. The top portion 36 may be separated from the bottom portion 38, for example, by a crane or other lifting device, to access the inner casing 32.

Figure 4:
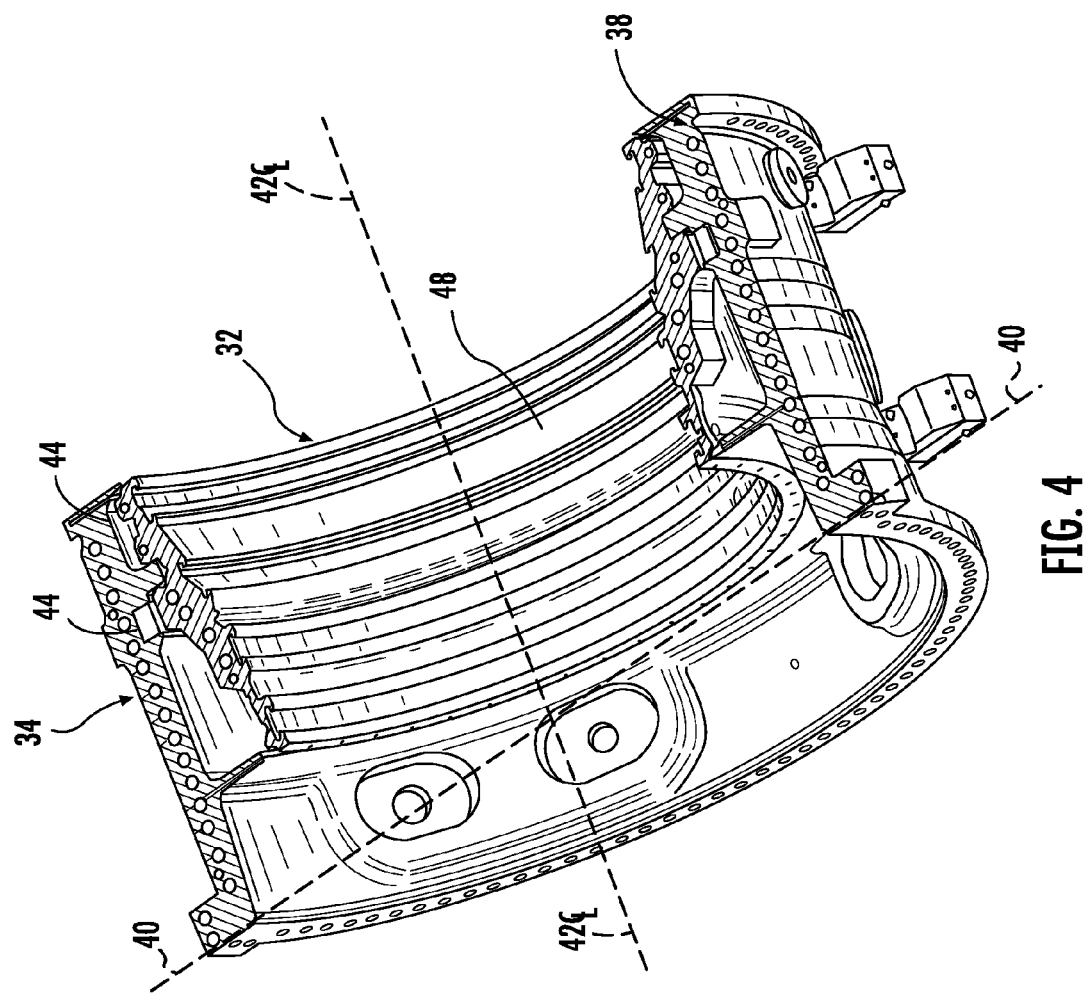
FIG. 4 illustrates a perspective view of a portion of the turbine section as shown in FIG. 3.

The inner casing 32 is seated within slots 44 that extend circumferentially along an inner surface of the outer casing 34. The inner casing 32 is split into an upper portion 46 and a lower portion 48 along the horizontal plane 40. The upper portion 46 may be separated from the lower portion 48 by a crane or other lifting device to access the lower portion 48 of the inner casing 32. As shown in FIG. 4, once the upper portion 46 of the inner casing 32 has been removed, the lower portion 48 of the inner casing 32 remains positioned in the bottom portion 38 of the outer casing 34. As previously discussed, the rotor shaft 24 (FIG. 1) would normally block access to the lower portion 48 of the inner casing 32, thereby hampering inspection and/or repair of the lower portion 48 of the inner casing 32.

Figure 5:
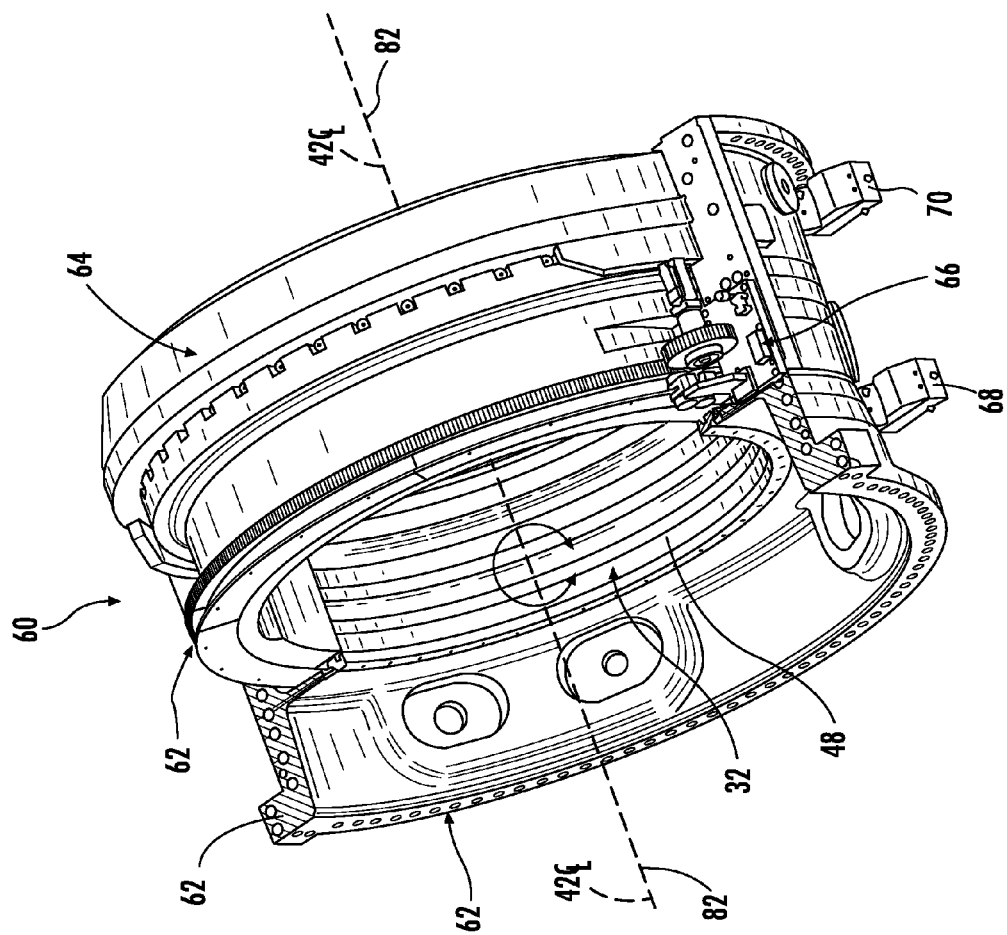
FIG. 5 illustrates a perspective view of a system for installing and removing a lower portion of an inner casing of the turbine section as shown in FIG. 4, according to at least one embodiment of the present disclosure.

FIG. 5 illustrates a prospective view of a system 60 for installing and/or removing the lower portion 48 of the inner casing 32 into or out of the bottom portion 38 of the outer casing 34. As shown, the system 60 generally includes a counter weight 62, a thrust collar 64 that supports and guides the counter weight 62 and/or the lower portion 48 of the inner casing 32, and a drive system 66 configured to rotate the counter weight 62 through at least 180 degrees of rotation about the axial centerline 42 of the inner and outer casings 32, 34. In various embodiments, the system 60 may further include a forward roller support 68 and an aft roller support 70 to support the lower portion 48 of the inner casing 32 during installation or removal.

Figure 6:
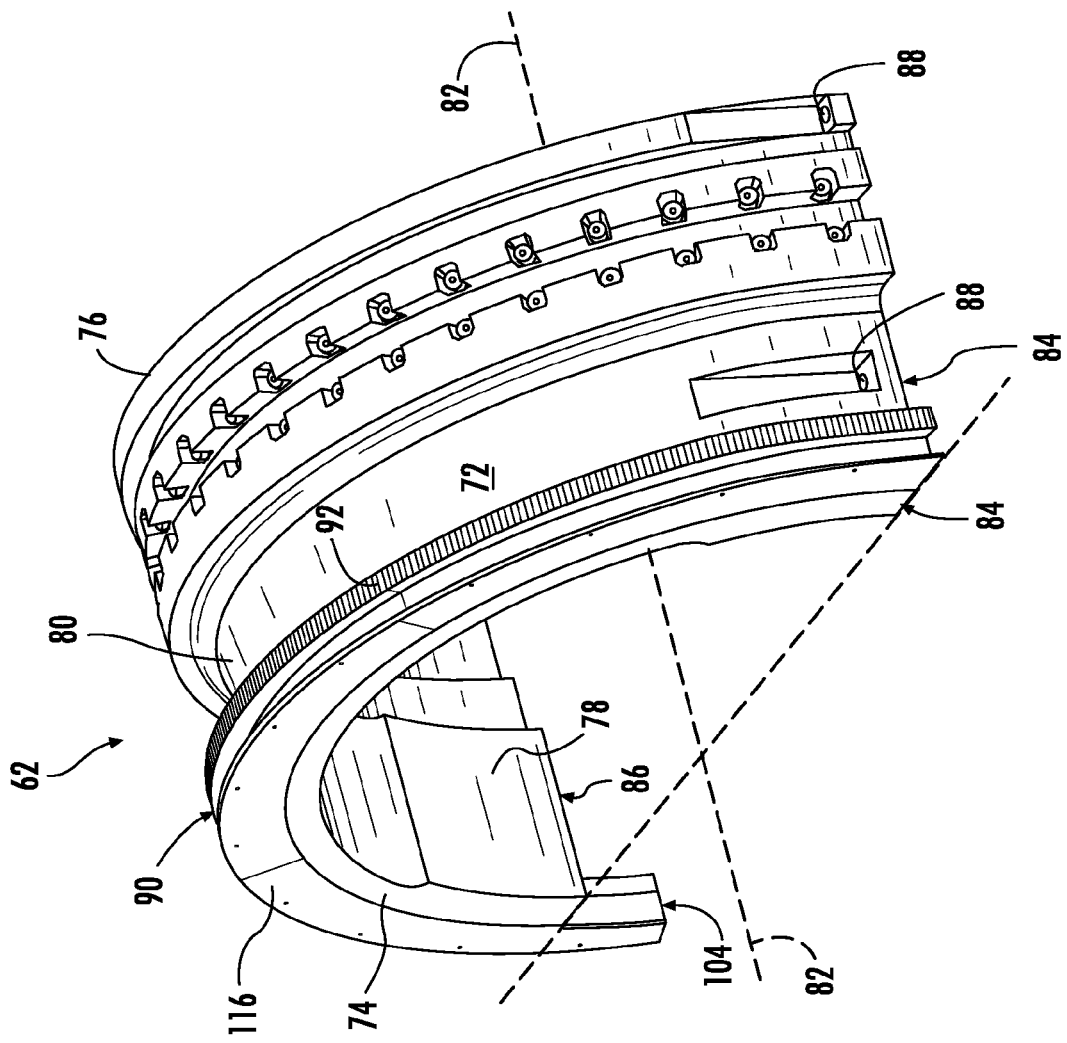
FIG. 6 illustrates a perspective view of a counter weight of the system for installing and removing a lower portion of an inner casing of the turbine section as shown in FIG. 5, according to various embodiments of the present disclosure.

FIG. 6 illustrates a prospective view of the counter weight 62 according to various embodiments of the present disclosure. As shown, the counter weight 62 generally includes a semi-annular main body 72. The shape of the main body 72 generally coincides with the shape of the lower portion 48 of the inner casing 32 shown in FIG. 4. As shown in FIG. 6, the main body 72 has a forward end 74, an aft end 76, an inner side 78 radially separated from an outer side 80. The aft end 76 is axially separated from the forward end 72 along an axial centerline 82 of the main body 72. In particular embodiments, axial centerline 82 of the main body 72 is coincident to the axial centerline 42 of the inner and the outer casings 32, 34. The outer side 80 is radially separated from the inner side 78 with respect to a plane that is perpendicular to the axial centerline 82 of the main body 72.

The main body 72 further includes a first radially extending mating surface 84 and a second radially extending mating surface 86 disposed on a circumferentially opposite side of the main body 72. The first and second radially extending mating surfaces 84, 86 extend radially outward between the inner and the outer sides 78, 80 of the main body 72 with respect to a plane that is perpendicular to the axial centerline 82. In particular embodiments, the first and second radially extending mating surfaces 84, 86 are defined along a horizontal plane that extends along the axial centerline 82 of the main body 72, thereby providing 180 degrees of separation between the first and second radially extending mating surfaces 84, 86. At least one hole 88 may extend through the outer side 80 of the main body 72 to allow for connection to the lower portion 48 of the inner casing 32 (FIG. 5).

Figure 7:
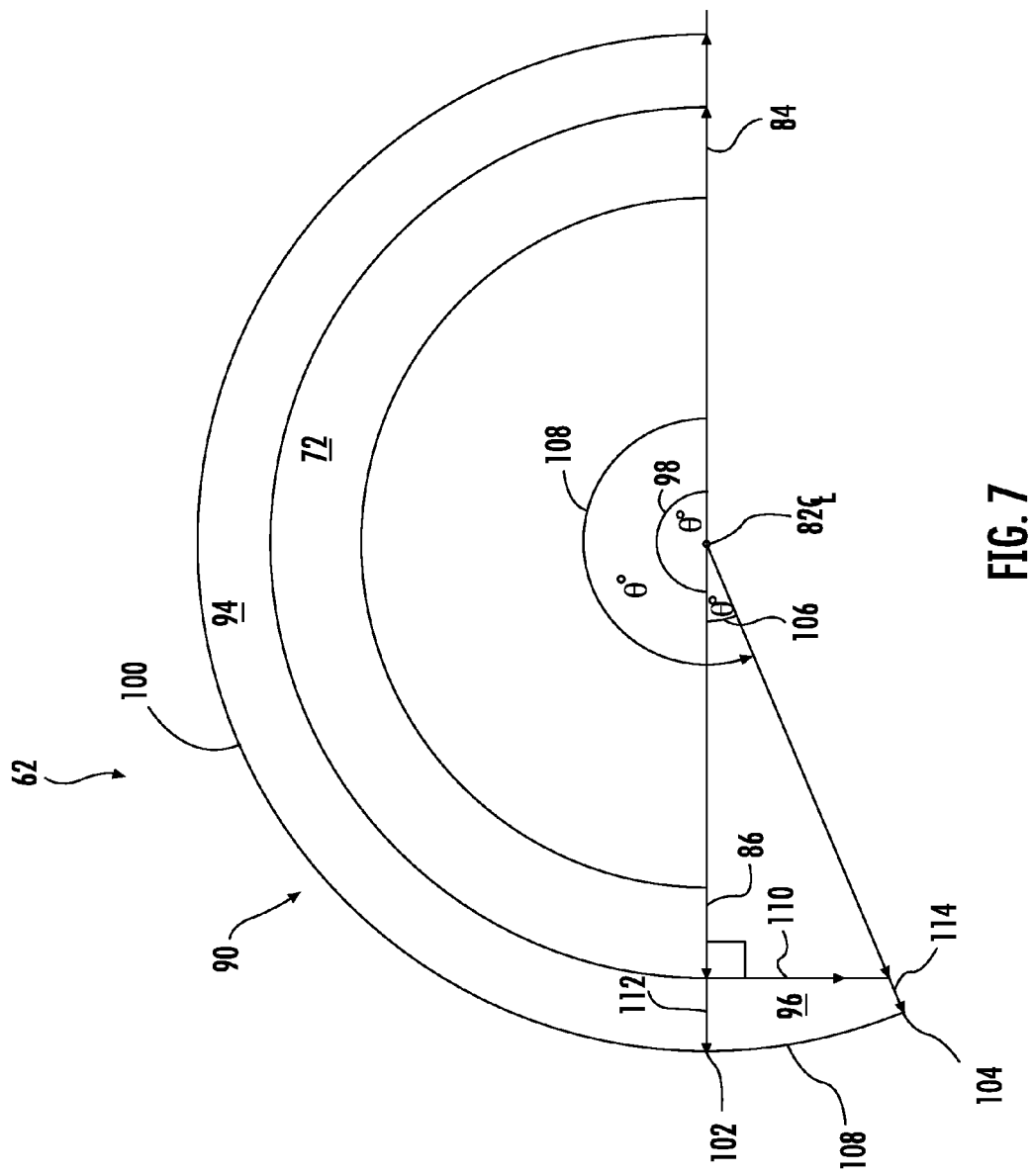
FIG. 7 illustrates a downstream view of a portion of the counter weight as shown in FIG. 6, according to at least one embodiment of the present disclosure.

As shown in FIG. 6, the counter weight 62 includes a radial gear rack 90 that extends radially outward from the outer side 80 of the main body 72. The radial gear rack may be disposed generally adjacent to the forward end 74 of the main body 72. FIG. 7 illustrates a downstream view of the main body 72 and the radial gear rack 90. As shown, the radial gear rack 90 extends along an arc defined in a plane that is perpendicular to the axial centerline 82 of the main body 72. The radial gear rack 90 may be fixed to the main body 72 in any manner known to one of ordinary skill in the art. For example, the radial gear rack 90 may be bolted, welded or pined to the main body 72. In alternate embodiments, the main body 72 may at least partially define the radial gear rack 90. As shown in FIG. 6, the radial gear rack 90 may include cuts or grooves 92 such as gear teeth disposed at least partially circumferentially around the radial gear rack 90. In addition or in the alternative, the radial gear rack 90 may have a continuous friction surface that extends at least partially circumferentially around the radial gear rack 90.

As shown in FIG. 7, the radial gear rack 90 includes a primary segment 94 and a secondary segment 96. The primary segment 94 extends a first angular distance 98 along an arc that extends between the first radially extending mating surface 84 and the second radially extending mating surface 86 in a plane that is perpendicular to the axial centerline 82 of the main body 72. In particular embodiments, the primary segment 94 extends from a point that is generally adjacent to the first radially extending mating surface 84. In alternate embodiments, the primary segment 94 extends from a point that is circumferentially separated from the first radially extending mating surface 84. In particular embodiments, the first angular distance 98 of the primary segment 94 is about 180 degrees. The primary segment 94 includes a radially outer arcuate surface 100. The outer arcuate surface 100 may be geared as shown in FIG. 6. In the alternative, the outer arcuate surface 100 may be a continuous friction surface. The primary segment 94

The secondary segment 96 of the radial gear rack 90 includes a first end 102 generally adjacent to the second radially extending mating surface 86, and a distal end 104 circumferentially separated from the first end 102. The secondary segment 96 extends a second angular distance 106 along an arc that extends between the second radially extending mating surface 86 and the distal end 104 of the secondary segment 96 in a plane that is perpendicular to the axial centerline 82 of the main body 72. In particular embodiments, the primary and the secondary segments 94, 96 extend a total angular distance 108 of greater than 180 degrees between the first radially extending mating surface 84 and the distal end 104 of the secondary segment 96 in a plane perpendicular to the axial centerline 82 of the main body 72. For example, in particular embodiments the primary and the secondary segments 94, 96 extend a total angular distance 108 of about 200 degrees.

The secondary segment 96 further includes a radially outer arcuate surface 108 that extends circumferentially between the first end 102 and the distal end 104. In particular embodiments, the outer arcuate surface 108 has a common radius with the arcuate outer surface 100 of the primary segment 94. The secondary segment 96 also includes an at least partially linear inner surface 110 herein referred to as "inner surface 110" that extends between the first end 102 and the distal end 104. In particular embodiments, the inner surface 110 is perpendicular to the second radially extending mating surface 86 of the main body 72. In addition or in the alternative, the inner surface 110 may be tapered inward towards the outer arcuate surface 108 between the first end 102 and the distal end 104 of the secondary segment 96.

As shown in FIG. 7, the outer arcuate surface 108 is radially separated from the inner surface 110 along a plane perpendicular to the axial centerline 82 of the main body 72. In at least one embodiment, the secondary segment 96 has a first radial thickness 112 measured between the inner surface 110 and the outer arcuate surface 108 at the first end 102 and a second radial thickness 114 measured between the inner surface 110 and the outer arcuate surface 108 at the distal end 104. In particular embodiments, the first radial thickness 112 is greater than the second radial thickness 114.

In particular embodiments, as shown in FIG. 6, an arcuate shaped friction brake plate 116 extends radially outward from the main body 72 of the counter weight 62 generally adjacent to the forward end 74 of the main body 72. The brake plate 116 extends along an arc that extends between the first radially extending mating surface 84 and the distal end 114 of the secondary segment 96 of the radial gear rack 90 in a plane that is perpendicular to the axial centerline 82 of the main body 72.

Figure 8:
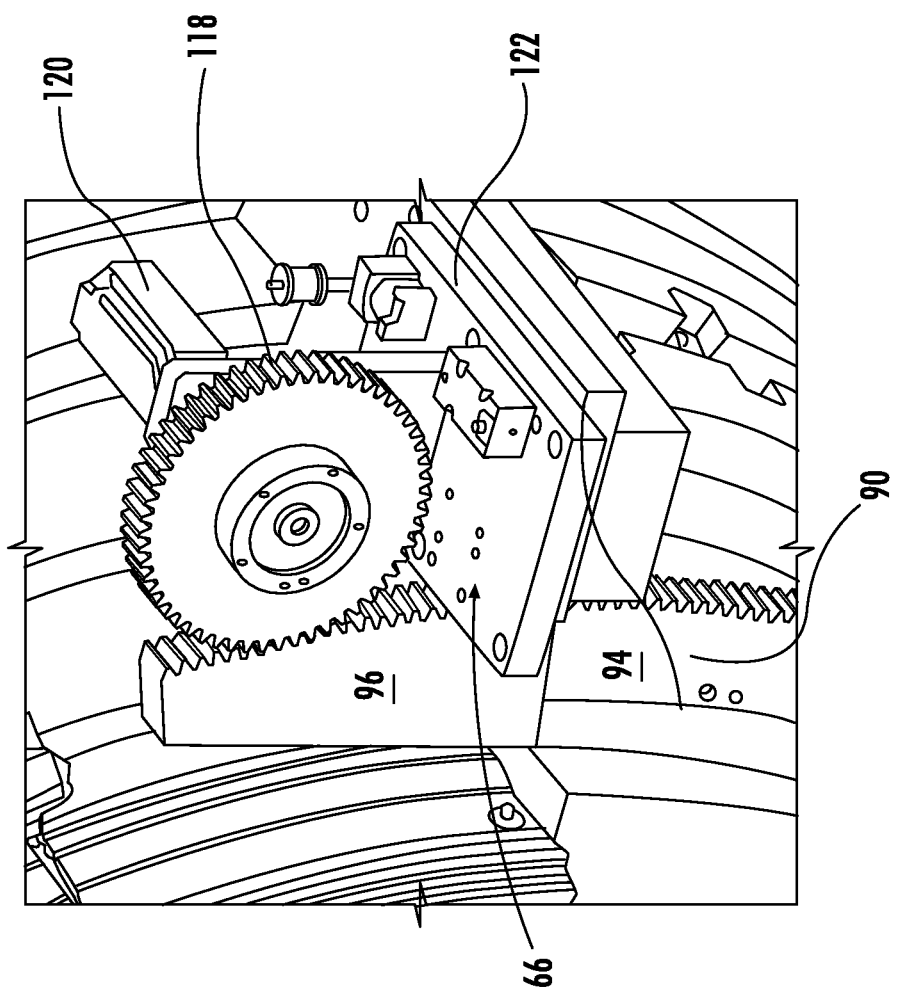
FIG. 8 illustrates a perspective view of a portion of the system for installing and removing a lower portion of an inner casing of the turbine section as shown in FIG. 5, according to at least one embodiment of the present disclosure.

FIG. 8 illustrates a perspective view of the drive system 66 as shown in FIG. 5. The drive system 66 as shown is as a gear-based system comprising a gear 118 powered by motor 120. The motor 120 may be electric, hydraulic, pneumatic or any other type of motor suitable for powering the drive system 66. The gear 118 is adapted to engage the radial gear rack 90 to rotate the counterweight 62 relative to the thrust collar locator 64 (FIG. 5). While a gear-based system is represented in the figures, other drive systems capable of rotating the bottom portion 38 of the inner casing and/or the counterweight 62 are also foreseeable, including but not limited to chain, hydraulic, pneumatic, and/or friction drive systems. In particular embodiments, as shown in FIG. 8, the gear 118 engages with the secondary segment 96 of the radial gear rack 90 to allow for continuous rotation of the counter weight 62 into or of out of the bottom portion 38 of the outer casing 34.

Figure 9:
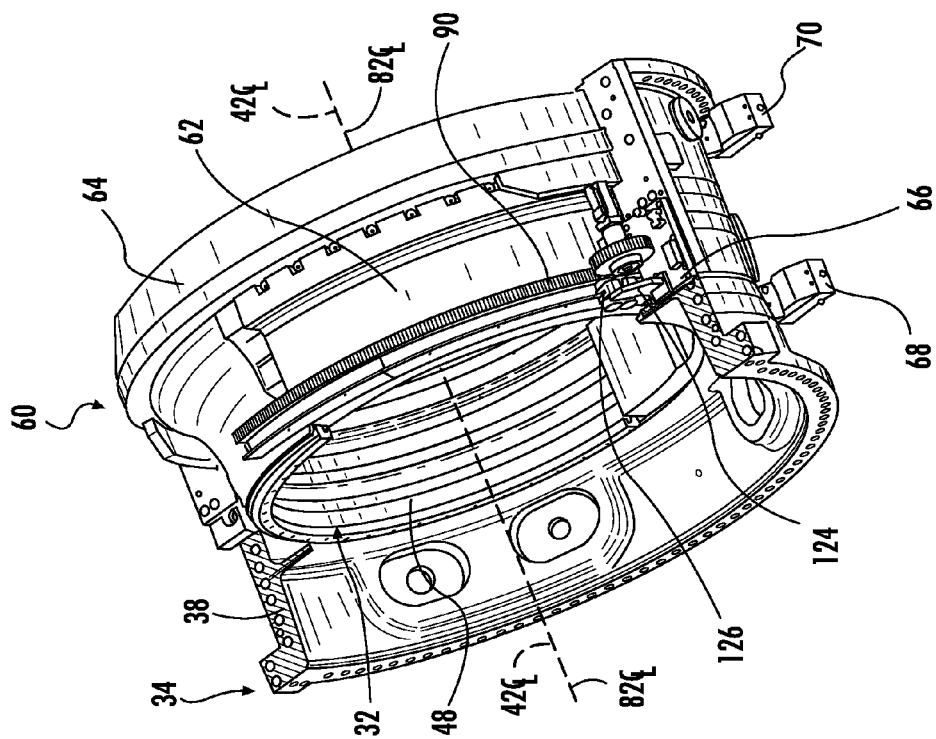
FIG. 9 illustrates a perspective view of the system for installing and removing a lower portion of an inner casing of the turbine section in operation according to various embodiments of the present disclosure.

The drive system 66 may be located on a support plate 122 together with a hydraulic friction braking unit 124 as shown in FIG. 9. The braking unit 124 comprises a brake slot 126 that, during operation, engages the brake plate 116 of the counterweight 62. The braking unit 124 applies friction to the brake plate 116 in order to slow or stop the rotation of counterweight 62 as well as secure its position while stationary. While a disk-type braking system is represented in the figures, other types of braking systems could be used.

Figure 10:
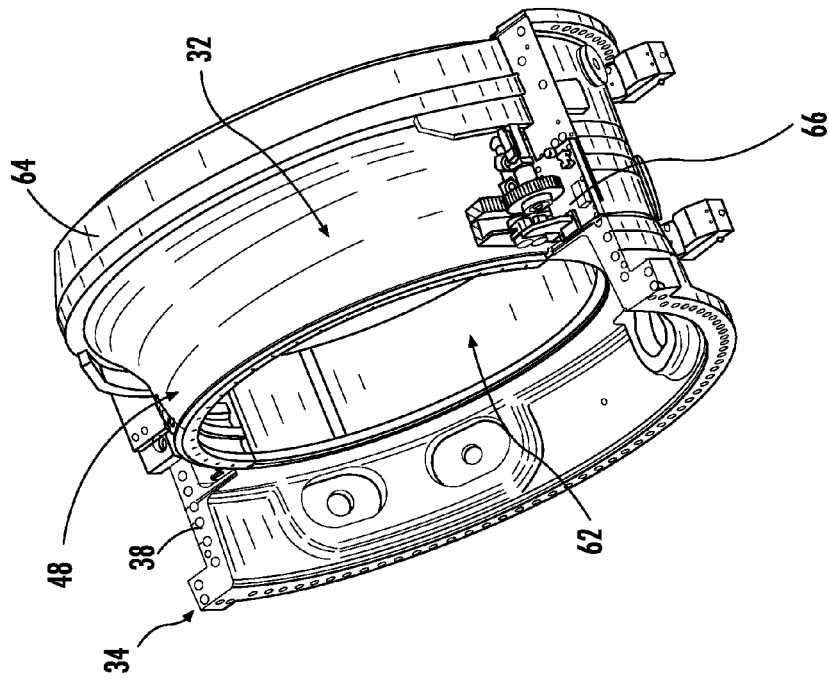
FIG. 10 illustrates a perspective view of the system for installing and removing a lower portion of an inner casing of the turbine section as shown in FIG. 5, in operation according to various embodiments of the present disclosure.
Figure 11:
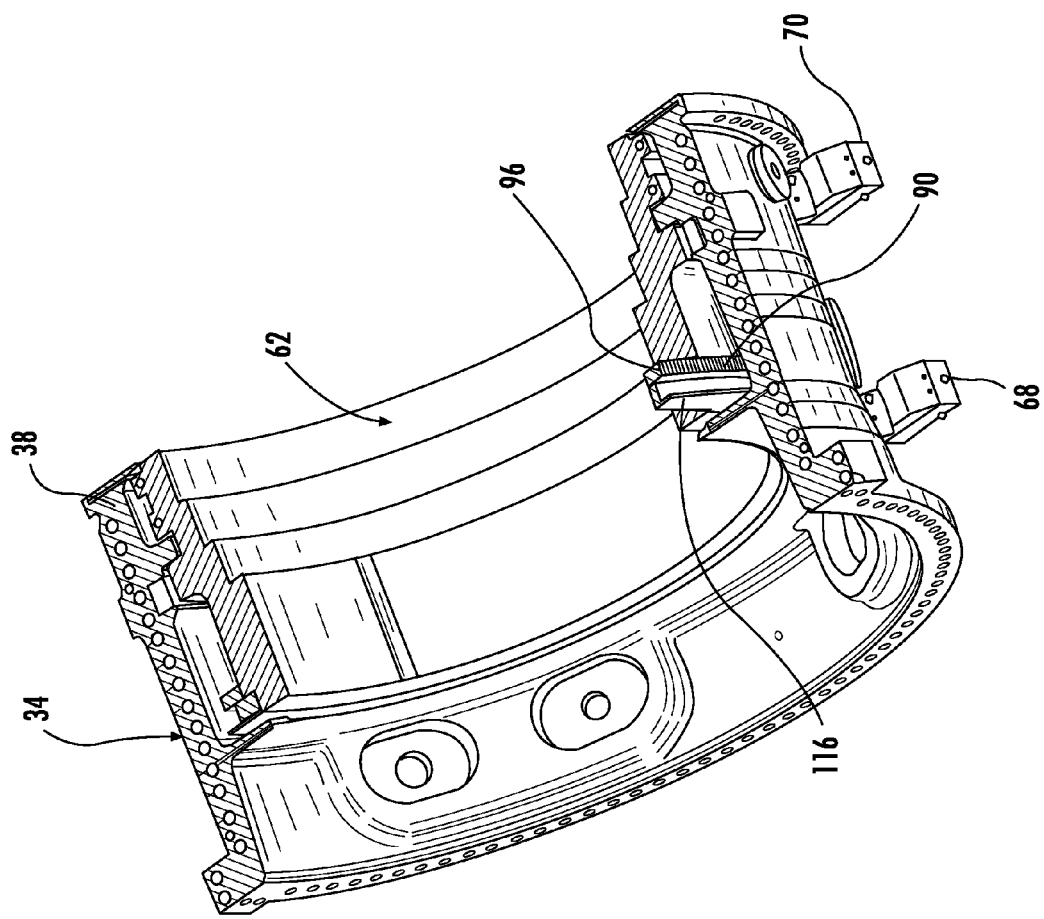
FIG. 11 illustrates a perspective view of the counter weight as shown in FIG. 6, installed into the turbine section according to various embodiments of the present disclosure.

FIGS. 9 and 10 illustrate the system 60 in operation, and FIG. 11 illustrates the counter weight 62 in position after removal of the lower portion 48 of the inner casing 32. In particular embodiments, as shown in FIG. 9, the drive system 66 engages with the radial gear rack 90 to rotate the lower portion 48 of the inner casing 32 and the counterweight 62 in unison around their respective axial centerlines 42, 82 which approximately coincides with the axial centerline 30 of the shaft 24 of the gas turbine 10 (FIG. 1). As shown in FIG. 9, the secondary segment of the radial gear rack allows the lower portion 48 of the inner casing 32 and the counterweight 62 to continuously rotate until the counterweight 62 is fully seated in the bottom portion 38 of the outer casing 34 and the lower portion 48 of the inner casing 32 is fully rotated out of the bottom portion 38 of the outer casing 34 as shown in FIG. 10.

Once the lower portion 48 of the inner casing 32 has been rotated free of the outer casing 34, the lower portion 48 of the inner casing 32 may be removed radially from the turbine section 18 in essentially the same manner as was the upper portion 46 of the inner casing 32, and thereby allow for maintenance of all turbine components that were previously circumscribed by the upper and lower portions 46, 48 of the inner casings 18 and 20. As shown in FIG. 11, the counter weight 62 may remain seated in the bottom portion 38 of the outer casing 34 until repairs are completed. It should be obvious to one of ordinary skill in the art, that the method described above may be reversed to re-install the lower portion 48 of the inner casing 32. In this manner, the secondary segment 96 of the radial gear rack 90 engages with the drive system 66 to allow continuous rotation of the counter weight 62 out of the bottom portion 38 of the outer casing 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A counter weight for installing and removing a lower portion of an inner casing of a turbine section of a gas turbine, the counter weight comprising:
   a. a semi-annular main body having a first radially extending mating surface and a second radially extending mating surface on an circumferentially opposite side of the main body; and
   b. a radial gear rack extending radially outward from the main body, the radial gear rack comprising:
      i. a primary segment extending a first angular distance between the first radially extending mating surface and the second radially extending mating surface of the main body; and
      ii. a secondary segment extending a second angular distance from the second radially extending mating surface of the main body, the secondary segment having an at least partially linear inner surface and an outer arcuate surface.

2. The counter weight as in claim 1, wherein the at least partially linear inner surface of the secondary segment is perpendicular to the second radially extending mating surface of the main body.

3. The counter weight as in claim 1, wherein the primary segment of the radial gear rack includes a radially outer arcuate surface having a common radius with the outer arcuate surface of the secondary segment.

4. The counter weight as in claim 1, wherein the secondary segment of the radial gear rack includes a first end adjacent to the second radially extending mating surface of the main body and a distal end circumferentially separated from the first end, the first end having a first radial thickness and the distal end having a second radial thickness.

5. The counter weight as in claim 4, wherein the first radial thickness is greater than the second radial thickness.

6. The counter weight as in claim 1, wherein the secondary segment of the radial gear rack has a first end adjacent to the second radially extending mating surface of the main body and a distal end circumferentially separated from the first end.

7. The counter weight as in claim 6, wherein the radial gear rack extends between the first radially extending mating surface of the main body and the distal end of the secondary segment a total angular distance greater than 180 degrees.

8. The counter weight as in claim 6, further comprising an arcuate brake plate adjacent to the radial gear rack.

9. A system for installing and removing a lower portion of an inner casing of a turbine section of a gas turbine, the system comprising:
   a. a semi-annular counter weight having a shape that coincides with the lower portion of the inner casing, the counter weight having a main body, the main body having a first radially extending mating surface and a second radially extending mating surface on an circumferentially opposite side of the main body;
   b. a radial gear rack extending radially outward from the main body, the radial gear rack having a primary segment extending a first angular distance between the first radially extending mating surface and the second radially extending mating surface, and a secondary segment extending a second angular distance from the second radially extending mating surface, the secondary segment having an at least partially linear inner surface and an outer arcuate surface; and
   c. a drive system engaged with the radial gear rack.

10. The system as in claim 9, wherein the drive system is engaged with the outer arcuate surface of the secondary segment of the radial gear rack.

11. The system as in claim 9, wherein the at least partially linear inner surface of the secondary segment of the radial gear rack is perpendicular to the second radially extending mating surface of the main body.

12. The system as in claim 9, wherein the counter weight is connected to the lower portion of the inner casing and the at least partially linear inner surface of the second segment of the radial gear rack extends at least partially around the lower portion of the inner casing.

13. The system as in claim 9, wherein the at least partially linear inner surface of the secondary segment of the radial gear rack is radially separated from the lower portion of the inner casing.

14. The system as in claim 9, wherein the primary segment of the radial gear rack includes an outer arcuate surface having a common radius with the outer arcuate surface of the secondary segment of the radial gear rack.

15. The system as in claim 9, wherein the secondary segment of the radial gear rack includes a first end adjacent to the second radially extending mating surface of the main body and a distal end circumferentially separated from the first end, the first end having a first radial thickness and the distal end having a second radial thickness.

16. The system as in claim 15, wherein the first radial thickness is greater than the second radial thickness.

17. The system as in claim 9, wherein the secondary segment of the radial gear rack has a first end adjacent to the second radially extending mating surface, and a distal end circumferentially separated from the first end.

18. The system as in claim 17, wherein the radial gear rack extends between the first radially extending mating surface of the main body and the distal end of the secondary segment a total angular distance greater than 180 degrees.

19. The system as in claim 17, further comprising a brake plate adjacent to the radial gear rack, the brake plate extending circumferentially between the first radially extending mating surface and a point generally adjacent to the distal end of the secondary segment of the radial gear rack.

20. The system as in claim 19, wherein the drive system further comprises a friction brake engaged with the brake plate.

* * * * *